United States Patent

Su

[11] Patent Number: 5,446,441
[45] Date of Patent: Aug. 29, 1995

[54] MOBILE SIGNAL LAMP AND MOUNT UNIT

[76] Inventor: Yan-Chang Su, 2 F., No. 47, Lane 77, Wen-Chang Street, Feng-Shan City, Kaohsiung Hsien, Taiwan

[21] Appl. No.: 346,275

[22] Filed: Nov. 22, 1994

[51] Int. Cl.⁶ .......................... B62J 3/00; G08B 23/00
[52] U.S. Cl. .................................... 340/432; 340/321; 340/332; 362/72
[58] Field of Search ............... 340/321, 332, 432; 362/72, 108, 190, 191

[56] References Cited

U.S. PATENT DOCUMENTS

| | | | |
|---|---|---|---|
| 4,319,309 | 3/1982 | Benoit | 340/321 |
| 4,324,879 | 4/1982 | Kelley | 340/432 |
| 4,949,228 | 8/1990 | Lin et al. | 340/432 |
| 5,243,461 | 9/1993 | Jiann-Shyan et al. | 340/432 |
| 5,276,593 | 1/1994 | Lighthill et al. | 340/432 |

*Primary Examiner*—Brent Swarthout
*Attorney, Agent, or Firm*—Varndell Legal Group

[57] ABSTRACT

A mobile signal lamp and lamp mount unit including a housing covered with a lampshade to hold a lamp assembly, a battery box fastened to a downward back chamber on the housing, and a signal lamp mounting device connected to the housing, the signal lamp mounting device including a belt for fastening to the user's wrist or waist or the bicycle frame, etc., a base frame turned about a screw on the buckle of the belt and retained in position by a rotary member, and a supporting frame pivotably connected to the base frame to hold the housing and fixed in the desired angular position by a screw bolt.

3 Claims, 5 Drawing Sheets

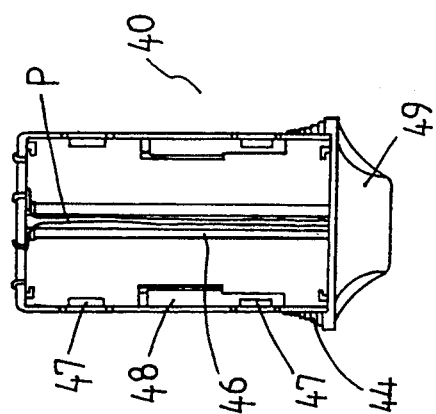
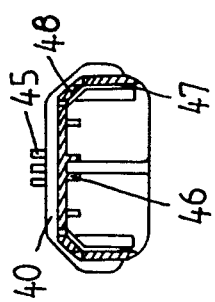
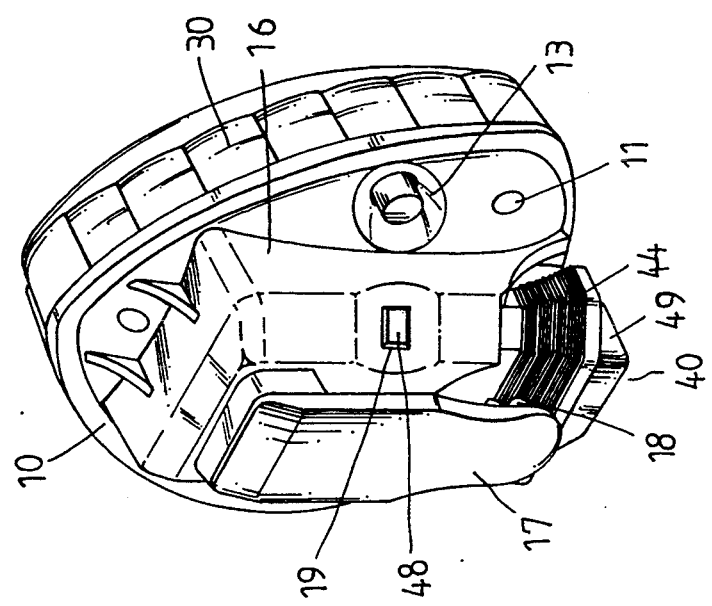

MOBILE SIGNAL LAMP AND MOUNT UNIT

BACKGROUND OF THE INVENTION

The present invention relates to signal lamps, and relates more particularly to a mobile signal lamp and lamp mount unit which can be conveniently fastened to the user's wrist or waist and adjusted to the desired angular position to give a warning signal.

Various reflectors and signal lamps are well known and intensively used to reflect light or give a warning sign. Because reflectors can only reflect outside light, they are less effective. During raining, reflectors cannot effectively reflect light. There are also known signal lamps designed for personal use. These personal signal lamps commonly have fastening means for fastening to the users. However, when a personal signal lamp is installed, its projecting angle cannot be conveniently adjusted.

SUMMARY OF THE INVENTION

The present invention has been accomplished under the circumstances in view. It is therefore an object of the present invention to provide a mobile signal lamp and lamp mount unit which is suitable for personal use. It is another object of the present invention to provide a mobile signal lamp and lamp mount unit which can be conveniently fastened to the user's wrist or waist or the bicycle frame, etc., to reflect outside light or to emit a visual warning signal. It is still another object of the present invention to provide a mobile signal lamp and lamp mount unit which can be conveniently adjusted to the desired angle. It is still another object of the present invention to provide a mobile signal lamp and lamp mount unit which has a self-provided battery power supply. It is still another object of the present invention to provide a mobile signal lamp and lamp mount unit which: can use external DC power supply.

To achieve the aforesaid objects, there is provided a mobile signal lamp and lamp mount unit comprised a signal lamp and a signal lamp mounting device. The signal lamp comprises a housing covered with a lampshade to hold a lamp assembly, and a battery box fastened to a downward back chamber on the housing. The signal lamp mounting device is connected to the housing, comprising a belt belt for fastening to the user's wrist or waist or the bicycle frame, etc., a base frame turned about a screw on the buckle of the belt and retained in position by a rotary member, and a supporting frame pivotably connected to the base frame to hold the housing and fixed in the desired angular position by a screw bolt. The battery box comprises a DC adapter for connecting an external DC power supply device to the lamp assembly.

BRIEF DESCRIPTION OF THE DRAWINGS

FIG. 9 is a rear elevational view of the signal lamp shown in FIG. 1;

FIG. 10 is a longitudinal view in section of the battery box according to the present invention; and FIG. 11 is a transverse view in section of the battery box according to the present invention.

DETAILED DESCRIPTION OF THE PREFERRED EMBODIMENT

Figure 1:
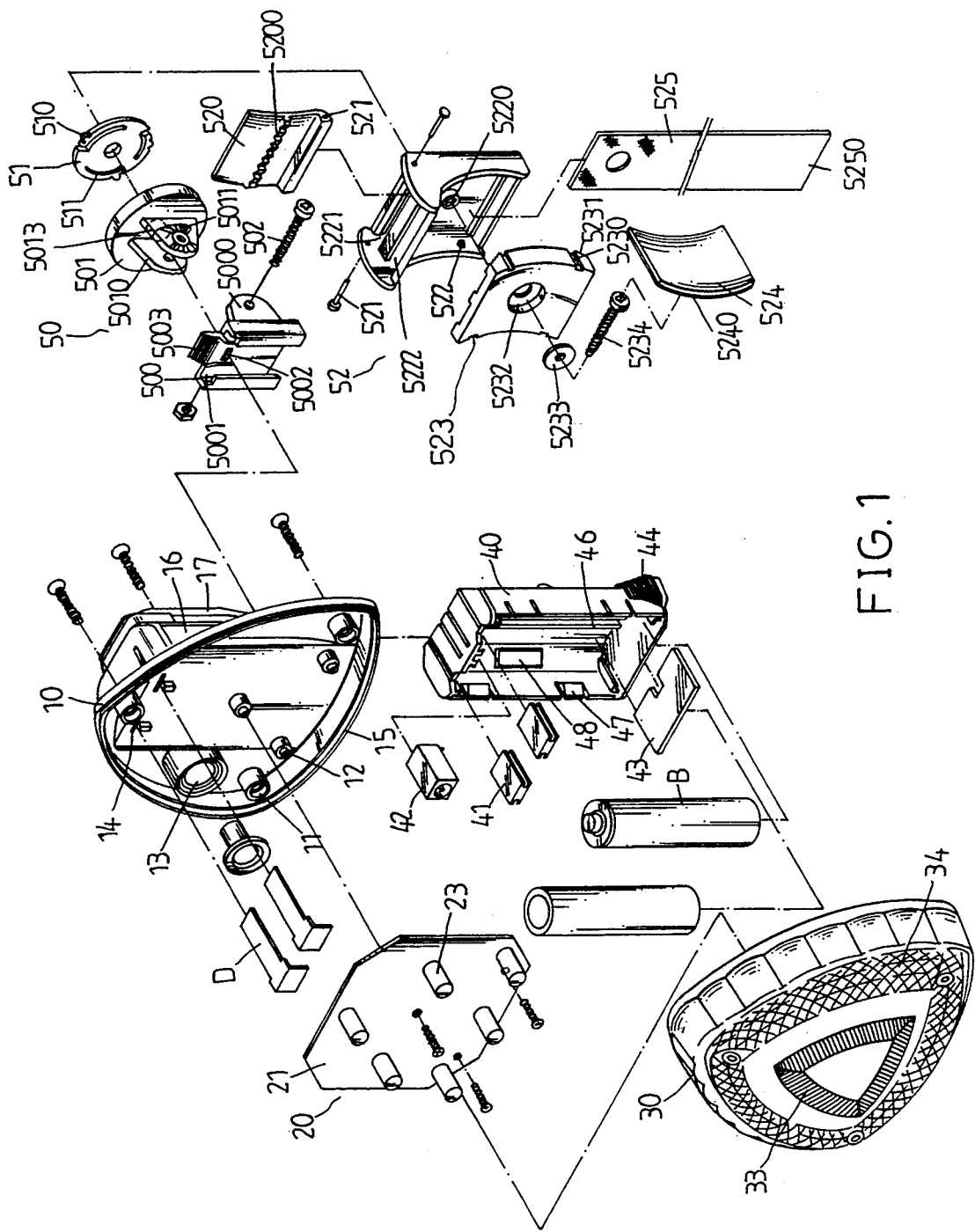
FIG. 1 is an exploded view of a mobile signal lamp and lamp mount unit according to the present invention.

Referring to FIG. 1, a mobile signal lamp and lamp mount unit in accordance with the present invention is generally comprised of a housing 10, a lamp assembly 20, a lampshade 30, a battery box 40, and a lamp mounting device 5.

Figure 2:
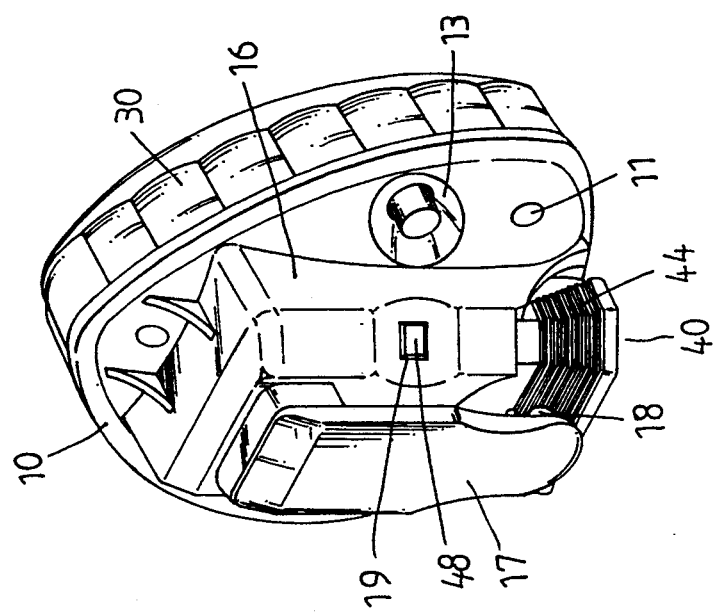
FIG. 2 is an elevational view of the signal lamp shown in FIG. 1.

Referring to FIG. 2 and FIG. 1 again, the housing 10 comprises a plurality of lampshade mounting posts 11 and lamp assembly mounting posts 12, a switch mounting hole 13, a press-button switch S mounted in the switch mounting hole 13, two contact slots 14, two contact metal plates D respectively fastened to the contact slots 14, a peripheral flange 15 raised along the periphery at a front side, a downward chamber 16 at a back side, a clip 17 extended downwards from the downward chamber 16 on the outside and terminating in a plurality of inward ribs 18, and a plurality of battery box mounting holes 19 through the downward chamber 16.

Figure 4:
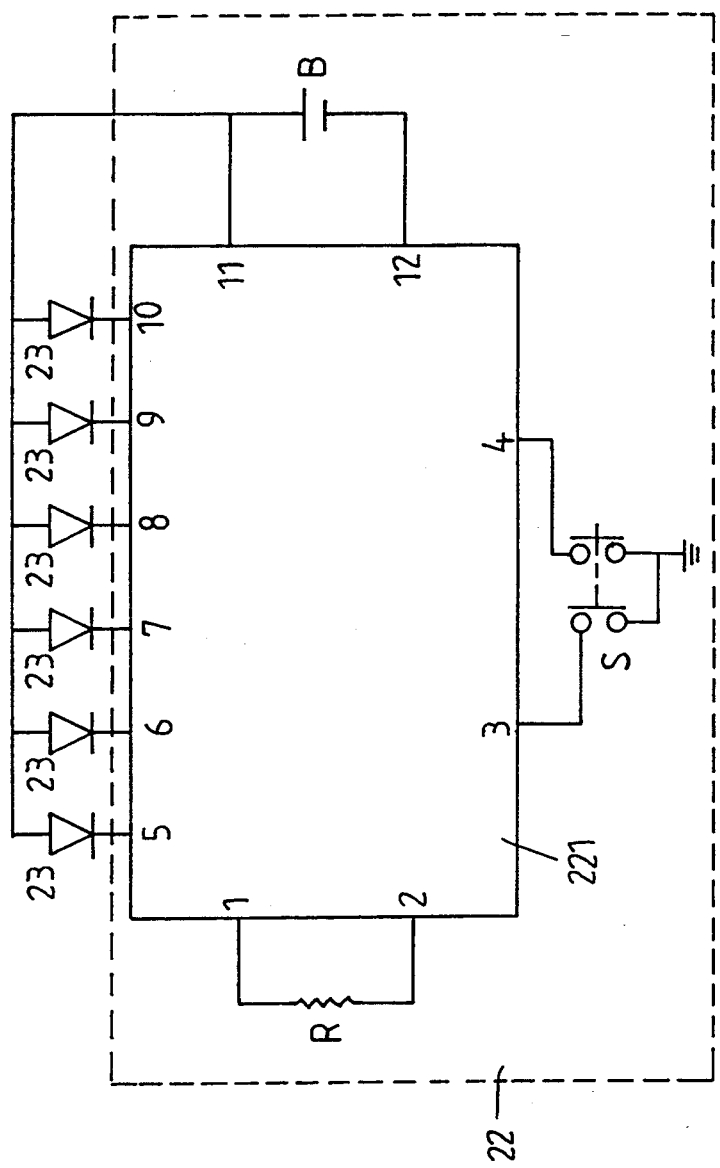
FIG. 4 is a circuit diagram of a control circuit according to the present invention.

Referring to FIG. 4 and FIG. 1 again, the lamp assembly 20 comprises a circuit board 21 fastened to the lamp assembly mounting posts 12 of the housing 10 and having a control circuit 22 and a plurality of light emitting devices 23 controlled by the control circuit 22. The control circuit 22 comprises a register 221. The first and second pins of the register 221 are connected by a resistor R. The third and fourth pins of the resistor 221 are connected to the aforesaid press-button switch S and driven by it to control the serial data output of the 5th through 10th pins of the resistor 221. The 11th and 12th pins of the resistor 221 are connected to a battery B. The light emitting devices 23 receive serial data outputted from the 5th through 10th pins of the register 221.

Figure 3:
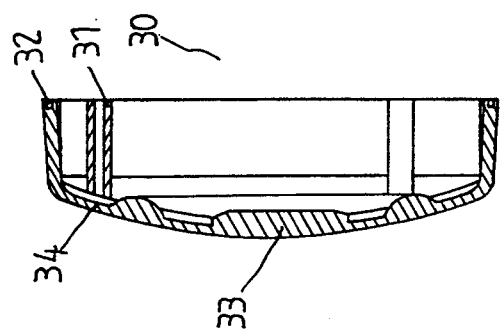
FIG. 3 is a right side view section of the lampshade shown in FIG. 1.

Referring to FIG. 3 and FIGS. 1 and 2 again, the lampshade 30 is a transparent shell covered on the housing 10 over the lamp assembly 20, having a plurality of mounting posts 31 respectively fastened to the lampshade mounting posts 11 of the housing 10 by screws, an endless mounting groove 32 into which the peripheral flange 15 of the housing 10 fits, a reflecting surface area 33 around the center, and a refracting surface area 34 around the reflecting surface area 33.

Referring to FIGS. 9 through 11 and FIG. 1 again, the battery box 40 is mounted in the downward chamber 16 of the housing 10, comprising two substantially U-shaped top contact metal plates 41 bilaterally horizontally disposed at the top, a power connector 42 disposed between the contact metal plates 41 for connection to an external power supply device, a flat bottom contact metal plate 43 horizontally disposed at the bottom, a plurality of raised stripes 44 horizontally disposed around the outside wall for the holding of the fingers positively, a plurality of ribs 45 raised from the back, which are engaged with the inward ribs 18 of the clip 17 when the battery box 40 is inserted into the downward chamber 16 of the housing 10, a plurality of locating rods 46 and 47, a plurality of battery cells B retained inside the battery box 40 by the locating rods 46 and 47 and connected in series by the top and bottom metal contact plates 41 and 43, and a plurality of retaining rods 48 respectively fastened to the battery box mounting holes 19 on the downward chamber 16 of the housing 10.

Referring to FIGS. 5 through 8 and FIG. 1 again, the lamp mounting device 5 comprises a signal lamp holder 50, a rotary member 51, and a fastening belt, which is comprised of a belt 525 and a buckle consisting of a casing 52 and a clamping plate 520. The signal lamp holder 50 comprises a supporting frame 500 and a base frame 501 fastened together by a screw bolt 502. The supporting frame 500 comprises two parallel lugs 5000 at the back side, a track 5001 at the front side mounted on the clip 17, a stop rod 5002 in the track 5001 stopped above the clip 17, a backward handle 5003 at the top by which the lamp mounting device 5 can be moved upwards away from the clip 17, and toothed portions 5004 on the lugs 5000 at an inner side. The base frame 501 comprises two parallel lugs 5010 at the front side respectively connected to the parallel lugs 5000 of the supporting frame 500 by the screw bolt 502, toothed portions 5011 on the lugs 5010 at an outer side and respectively engaged with the toothed portions 5004 on the lugs 5000 of the supporting frame 500, an internally threaded mounting rod 5013 at the back side, and a unitary internal gear 5014 at the back side around the internally threaded mounting rod 5013. When the screw bolt 502 is loosened, the supporting frame 500 can be turned about the screw bolt 502 to change its angular position relative to the base frame 501. The rotary member 51 is made of circular shape mounted around the internally threaded mounting rod 5013 of the base frame 501, having three teeth 510 equiangularly spaced around the border and engaged with the internal gear 5014 of the base frame 501, a plurality of curved splits 511 extended to the border, and square flange 512 at the back side. When the rotary member 51 is turned about the mounting rod 5013, the curved splits 511 permit the teeth 510 to be forced inwards to release the rotary member 51 from the constraint of the internal gear 5014. When the rotary member 51 is stopped, the rotary member 51 automatically returns to its former shape (because of its resilient material property), causing the teeth 510 to engage with the internal gear 5014 again. The clamping plate 520 has a serrated portion 520 transversely disposed in the middle and forced to hold down the tail 5050 of the belt 525, and two pivot holes 521 bilaterally disposed at one end and pivotably fastened to the casing 52 by pivots 521. The casing 52 comprises a center through hole 5220 connected to the mounting rod 5013 of the base frame 501, a square recess 5201 at a back side into which the square flange 512 of the rotary member 51 fits, a plurality of projecting rods 522 bilaterally disposed on the inside, a first belt slot 5221 and a second belt slot 5222 transversely disposed in parallel at one end, and two pivot holes 5221 bilaterally disposed at one end adjacent to the first belt slot 5221 and respectively connected to the pivot holes 521 on the clamping plate 520 by the pivots 521, A packing frame 523 is received in the casing 52, having a countersunk hole 5232 at the center connected to the center through hole 5220 and the internally threaded mounting rod 5013 of the base frame 501 by a screw 5234 and a washer 5233, a plurality of locating grooves 5230, which receive the projecting rods 522 of the casing 52 respectively, and toothed surface portions 5231 stopped against inside wall of the casing 52. An ornamental covering 524 with a sticking surface 5240 is covered on the packing frame 523 for decoration. The belt 525 has one end mounted on the screw 5234, and an opposite end (the tail) 5250 inserted through the first belt slot 5221 and the second belt slot 5222 and then held down by the clamping plate 520, permitting the whole assembly of the mobile signal lamp and lamp mount unit to be fastened to the wrist or waist.

Figure 7:
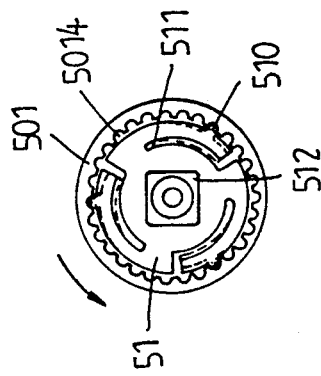
FIG. 7 shows the rotary member of the lamp mounting device turned relative to the internal gear of the base frame of the signal lamp holder thereof according to the present invention.
Figure 8:
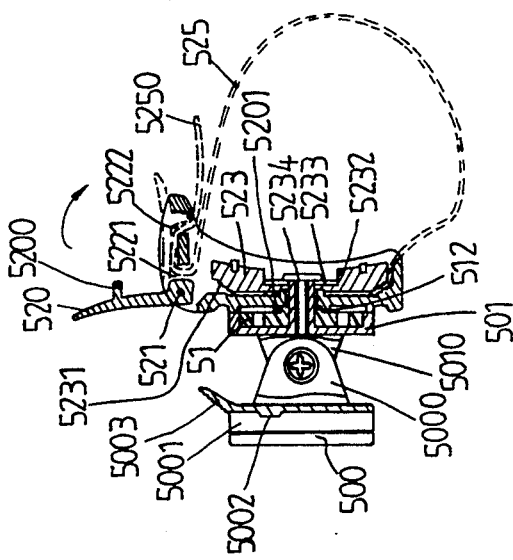
FIG. 8 is similar to FIG. 5 but showing the belt fastened.
Figure 5:
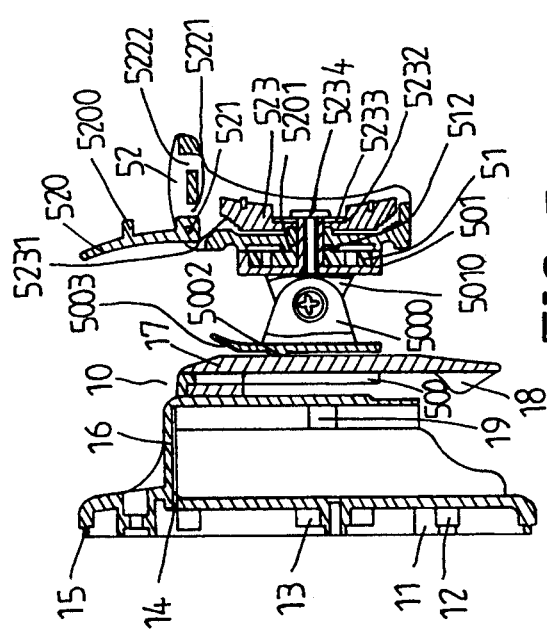
FIG. 5 is a side view in section of the mobile signal lamp and lamp mount unit shown in FIG. 1.
Figure 6:
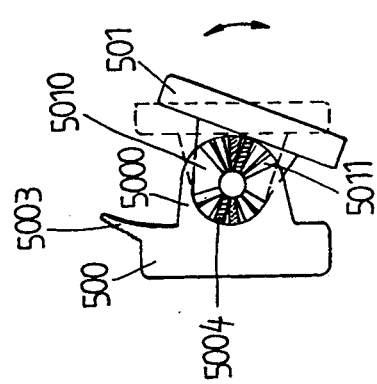
FIG. 6 shows the base frame of the signal lamp holder turned relative to the supporting frame thereof according to the present invention.

When the signal lamp and lamp mount unit is installed, the projecting angle of the signal lamp (the housing 10, lamp assembly 20 and lampshade 30) can be adjusted by turning the rotary member 51 relative to the base frame 501 and turning the the base frame 501 relative to the supporting frame 500 (see FIGS. 6 and 7). The reflecting surface area 33 of the lampshade 30 reflects light when the lamp assembly 20 does no work. When the lamp assembly 20 is turned on, the light of the light emitting devices 23 is refracted in all directions through the refracting surface area 34 to give a visual warning signal. When to replace the battery cells B, the battery box 40 can be conveniently removed from the downward chamber 16 of the housing 10 by squeezing the retaining rods 48 inwards from the battery box mounting holes 19 and then pulling the raised stripes 44 of the battery box 40 downwards from the downward chamber 16 of the housing 10.

Referring to FIG. 10 again, the battery box 40 further comprises a DC adapter 49 disposed at the bottom and connected to the top contact metal plates 41 by conductors P. Therefore, external DC power supply can be connected to the lamp assembly 20 through the battery box 40.

While only one embodiment of the present invention has been shown and described, it will be understood that various modifications and changes could be made without departing from the spirit and scope of the invention.

I claim:

1. A mobile signal lamp and lamp mount unit comprising:

a housing, said housing comprising a plurality of lampshade mounting posts and lamp assembly mounting posts, a switch mounting hole, a press-button switch mounted in said switch mounting hole, two contact slots, two contact metal plates respectively fastened to the contact slots, a peripheral flange raised along the periphery at a front side, a downward chamber at a back side, a clip extended downwards from said downward chamber on the outside and terminating in a plurality of inward ribs, and a plurality of battery box mounting holes through said downward chamber;

a lamp assembly mounted inside said housing and electrically connected to the contact metal plates of said housing, said lamp assembly comprising a circuit board fastened to said lamp assembly mounting posts and having a control circuit and a plurality of light emitting devices controlled by said control circuit;

a transparent lampshade covered on said housing over said lamp assembly, said lampshade comprising a plurality of mounting posts respectively fastened to said lampshade mounting posts of said housing by screws, an endless mounting groove, which receives the peripheral flange of said housing, a reflecting surface area for reflecting external light, and a refracting surface area, which refracts light from said lamp assembly;

a battery box mounted in said downward chamber of said housing, said battery box comprising two substantially U-shaped top contact metal plates bilaterally horizontally disposed at a top in contact with the contact metal plates of said housing, a power connector for connection to an external power supply device, a flat bottom contact metal plate horizontally disposed at a bottom, a plurality of raised stripes horizontally disposed around an outside wall, a plurality of ribs at a back side and engaged with the inward ribs of said clip, a plurality of locating rods, a plurality of battery cells retained in position by said locating rods and connected in series by the top and bottom metal contact plates of said battery box, and a plurality of retaining rods respectively fastened to said battery box mounting holes on said downward chamber of said housing;

a lamp mounting device for fastening said housing to a user, said lamp mounting device comprising a signal lamp holder, a rotary member, and a fastening belt, said fastening belt comprised of a belt and a buckle, said buckle comprised of a casing, a clamping plate, a packing frame, and an ornamental covering, said signal lamp holder comprising a supporting frame, which holds said housing, and a base frame connected between said supporting frame and said rotary member, said supporting frame comprising two parallel lugs at a back side, a track at a front side mounted on said clip, a stop rod stopped above said clip, a backward handle top, and toothed portions on the lugs of said supporting frame, said base frame comprising two parallel lugs pivotably connected to the lugs of said supporting frame by a screw bolt, portions on the lugs of said base frame respectively engaged with with the toothed portions on the lugs of said supporting frame, an internally threaded mounting rod at a back side, and a unitary internal gear at the back side of said base frame around said internally threaded mounting rod, said rotary member being made of circular shape mounted to said internally threaded mounting rod of said base frame, having a plurality of teeth equiangularly spaced around a border of the rotary member and engaged with said internal gear of said base frame, a plurality of curved splits extended to the border, and a square flange at the back side of said rotary member, said clamping plate being pivotably connected to said casing, said casing comprising a center through hole connected to said internally threaded mounting rod of said base frame, a square recess at a back side, which receives said square flange of said rotary member, a plurality of projecting rods bilaterally disposed on the inside, and two belt slots transversely disposed in parallel at a top end, said packing frame being received in said casing, having a countersunk hole at the center connected to the center through hole of said casing and said internally threaded mounting rod of said base frame by a screw and a washer, and a plurality of locating grooves, which receive the projecting rods of said casing respectively, said ornamental covering being covered on said packing frame, said belt having one end mounted around the screw on the center through hole of said casing and retained between said casing and said packing frame, and an opposite end inserted through said belt slots and held down by said clamping plate to fasten the mobile signal lamp and lamp mount unit to the user.

2. The mobile signal lamp and lamp mount unit of claim 1 wherein said control circuit comprises a 12-pin register having the first and second pins connected by a resistor, the third and fourth pins connected to said press-button switch, the fifth through the tenth pins controlled by said press-button switch to output serial data to said light emitting devices, the eleventh and twelfth pins connected to said battery cells.

3. The mobile signal lamp and lamp mount unit of claim 1 wherein said battery box further comprises a DC adapter for connection to external DC power supply.

* * * * *